US011977910B1

(12) United States Patent
Emelyanov

(10) Patent No.: US 11,977,910 B1
(45) Date of Patent: *May 7, 2024

(54) SYSTEMS AND METHODS FOR MOVING PROCESSES TO A VIRTUAL MACHINE BY CONFIGURING NETWORK CONNECTIONS

(71) Applicant: Virtuozzo International GmbH, Schaffhausen (CH)

(72) Inventor: Pavel Emelyanov, Moscow (RU)

(73) Assignee: Virtuozzo International GmbH, Schaffhausen (CH)

( * ) Notice: Subject to any disclaimer, the term of this patent is extended or adjusted under 35 U.S.C. 154(b) by 86 days.

This patent is subject to a terminal disclaimer.

(21) Appl. No.: 17/898,926

(22) Filed: Aug. 30, 2022

Related U.S. Application Data

(63) Continuation of application No. 17/038,397, filed on Sep. 30, 2020, now Pat. No. 11,567,794.

(51) Int. Cl.
*G06F 9/455* (2018.01)
*G06F 9/48* (2006.01)
*G06F 12/1009* (2016.01)

(52) U.S. Cl.
CPC ........ *G06F 9/45558* (2013.01); *G06F 9/4856* (2013.01); *G06F 12/1009* (2013.01); *G06F 2009/4557* (2013.01); *G06F 2009/45579* (2013.01); *G06F 2009/45583* (2013.01); *G06F 2212/151* (2013.01)

(58) Field of Classification Search
CPC .................................................. G06F 9/45558
USPC ........................................................... 718/1
See application file for complete search history.

(56) References Cited

U.S. PATENT DOCUMENTS

| | | | | |
|---|---|---|---|---|
| 7,484,208 B1* | 1/2009 | Nelson | .................. | G06F 3/0647 718/1 |
| 7,512,769 B1* | 3/2009 | Lowell | .................... | G06F 9/461 711/165 |
| 9,760,400 B1* | 9/2017 | Emelyanov | ......... | H04L 67/1008 |
| 10,402,341 B2* | 9/2019 | Apfelbaum | ......... | G06F 12/1009 |
| 10,452,408 B1* | 10/2019 | Emelyanov | ........... | G06F 9/4843 |
| 10,620,985 B2* | 4/2020 | Dabak | ....................... | G06F 8/65 |
| 10,795,659 B1* | 10/2020 | Kinsburskiy | ............. | G06F 8/65 |
| 11,182,473 B1* | 11/2021 | Ha | ....................... | G06F 9/45558 |
| 11,216,343 B1* | 1/2022 | Emelyanov | ......... | G06F 11/1451 |
| 2004/0193819 A1* | 9/2004 | Marinescu | .......... | G06F 12/0253 711/E12.009 |
| 2008/0271031 A1* | 10/2008 | Herington | ............... | G06F 9/485 718/104 |

(Continued)

*Primary Examiner* — Mehran Kamran
(74) *Attorney, Agent, or Firm* — ArentFox Schiff LLP; Michael Fainberg

(57) ABSTRACT

Disclosed herein are systems and method for moving a process from a host to a virtual machine (VM). In one exemplary aspect, a method comprises freezing the process at a host operating system (OS) of the host; transferring at least one kernel object of the process from the host OS to a VM OS of the VM; reconfiguring at least one input-output (IO) resource of the process to point to a host-VM channel such that data flow between the host and the VM is enabled; in response to determining that the IO resource is a network socket and that the VM has network access, creating a network socket on the VM side and re-configuring a network connection of the VM; mapping memory utilized by the process to the VM by remapping at least one page of the memory into the VM OS; and unfreezing the process at the VM OS.

18 Claims, 8 Drawing Sheets

(56) References Cited

U.S. PATENT DOCUMENTS

| | | | |
|---|---|---|---|
| 2013/0212709 A1* | 8/2013 | Tucker | G06F 21/55 726/29 |
| 2013/0227565 A1* | 8/2013 | Lee | G06F 9/45558 718/1 |
| 2013/0238786 A1* | 9/2013 | Khesin | H04L 67/025 709/224 |
| 2015/0020071 A1* | 1/2015 | Phelan | G06F 9/5016 718/1 |
| 2015/0026681 A1* | 1/2015 | Lin | G06F 9/45533 718/1 |
| 2016/0253196 A1* | 9/2016 | van Riel | G06F 9/5016 718/1 |
| 2018/0210736 A1* | 7/2018 | Aimone | G06F 9/5016 |
| 2018/0267818 A1* | 9/2018 | Dabak | G06F 12/109 |
| 2021/0026707 A1* | 1/2021 | Rosenberg | G06F 9/45558 |
| 2021/0374242 A1* | 12/2021 | Dabak | G06F 9/45558 |

* cited by examiner

SYSTEMS AND METHODS FOR MOVING PROCESSES TO A VIRTUAL MACHINE BY CONFIGURING NETWORK CONNECTIONS

CROSS-REFERENCE TO RELATED APPLICATIONS

This application is a continuation of U.S. Non-Provisional application Ser. No. 17/038,397 filed Sep. 30, 2020, which is herein incorporated by reference.

FIELD OF TECHNOLOGY

121 The present disclosure relates to the field of virtual machines, and, more specifically, to systems and methods for transparent entering of a process into a virtual machine.

BACKGROUND

Consider a virtual execution environment (VEE) such as a virtual machine (VM) that runs on a host machine. The host operating system (OS) may desire to launch a process inside the VM to perform some action. This type of launch is known as entering. Entering also applies to other types of VEEs such as containers (isolated user space instances). In the case of a container, the entering is performed by the means of the host OS kernel, and either a fork method or a push method can be used. In the fork method, the OS kernel creates a new process right inside the container. In the push method, the OS kernel physically moves an existing process from the host into the container by re-shuffling the respective in-kernel structures.

Using the push method rather than the fork method has several advantages. One advantage is the ability to transparently preserve the state of execution of the running process when crossing the host—virtual environment boundary. This preservation is very limited (e.g., subject to the abilities of the programming language used to write the code of the running process) without pushing.

In conventional VM systems, an agent inside the VM receives a request from the host machine and spawns a process in the VM context. This is analogous to the fork method described for containers. However, in terms of the push method, pushing a given process inside a VM is not yet possible. Furthermore, because the respective internal structure, design and arrangement of a VM and a container are different, the push method cannot be technically mirrored for VMs. For example, in case of a VM, the host OS kernel has no access to guest OS in-kernel structures inside of the VM. There thus exists a need for enabling transparent entering of a process into a VM.

SUMMARY

Accordingly, aspects of the disclosure describe systems and methods for transparently pushing a process from a host to a virtual machine (VM). In one exemplary aspect, a method comprises freezing the process at a host operating system (OS) of the host; transferring at least one kernel object of the process from the host OS to a VM OS of the VM; reconfiguring at least one input-output (IO) resource of the process to point to a host-VM channel such that data flow between the host and the VM is enabled; mapping memory utilized by the process to the VM by remapping at least one page of the memory into the VM OS; and unfreezing the process at the VM OS.

In some aspects, transferring the at least one kernel object further comprises determining whether the host OS and the VM OS are of a same type of operating system, and in response to determining that the host OS and the VM OS are of the same type, copying the at least one kernel object from the host OS to the VM OS.

In some aspects, the method comprises executing a live-migration technique to perform the transferring in response to determining that the host OS and the VM OS are not of the same type.

In some aspects, transferring the at least one kernel object further comprises determining whether the host OS and the VM OS have a same format of kernel objects, and in response to determining that the host OS and the VM OS have the same format of kernel objects, copying the at least one kernel object from the host OS to the VM OS.

In some aspects, the method comprises executing a live-migration technique to perform the transferring in response to determining that the host OS and the VM OS do not have the same format of kernel objects.

In some aspects, the host-VM channel comprises at least one of: (1) a hypervisor channel, on a hypervisor side, configured to forward data between the VM and the host, (2) a first proxy process, on a host side, configured to forward data between the hypervisor channel and the at least one IO resource, and (3) a second proxy process, on a VM side, configured to forward data between the hypervisor channel and the process.

In some aspects, the method comprises omitting the first proxy process such that a channel peer is attached to the hypervisor channel in response to determining that the at least one IO resource is at least one of a pipe or a unix socket, and omitting both the first proxy process and the second proxy process in response to determining that the at least one IO resource is a local channel.

In some aspects, the method comprises replacing the host-VM channel with a socket on the VM side and a network address translation (NAT) tunnel on the host side in response to determining that the at least one IO resource is a network socket and that the VM has network access.

In some aspects, the method comprises creating a network socket on the VM side and re-configuring a network connection of the VM in response to determining that the at least one IO resource is a network socket and that the VM has network access.

In some aspects, mapping the memory further comprises one of adding nested page table entries to translate VM physical addresses to host physical addresses, or altering shadow page tables.

In some aspects, mapping the memory comprises attaching the host-VM channel to the process.

In some aspects, at least one memory mapped file is proxied using the host-VM channel.

In some aspects, the method further attaches the host-VM channel to the process.

In some aspects, the method comprises determining whether at least one library mapped into the process matches between the host OS and the VM OS, and configuring a corresponding memory map of the process to point to the at least one library in the VM OS in response to determining that the at least one library matches.

It should be noted that the methods described above may be implemented in a system comprising a hardware processor. Alternatively, the methods may be implemented using computer executable instructions of a non-transitory computer readable medium.

The above simplified summary of example aspects serves to provide a basic understanding of the present disclosure. This summary is not an extensive overview of all contemplated aspects, and is intended to neither identify key or critical elements of all aspects nor delineate the scope of any or all aspects of the present disclosure. Its sole purpose is to present one or more aspects in a simplified form as a prelude to the more detailed description of the disclosure that follows. To the accomplishment of the foregoing, the one or more aspects of the present disclosure include the features described and exemplarily pointed out in the claims.

BRIEF DESCRIPTION OF THE DRAWINGS

The accompanying drawings, which are incorporated into and constitute a part of this specification, illustrate one or more example aspects of the present disclosure and, together with the detailed description, serve to explain their principles and implementations.

DETAILED DESCRIPTION

Exemplary aspects are described herein in the context of a system, method, and computer program product for transparently moving a process from a host to a virtual machine (VM). Those of ordinary skill in the art will realize that the following description is illustrative only and is not intended to be in any way limiting. Other aspects will readily suggest themselves to those skilled in the art having the benefit of this disclosure. Reference will now be made in detail to implementations of the example aspects as illustrated in the accompanying drawings. The same reference indicators will be used to the extent possible throughout the drawings and the following description to refer to the same or like items.

Figure 1:
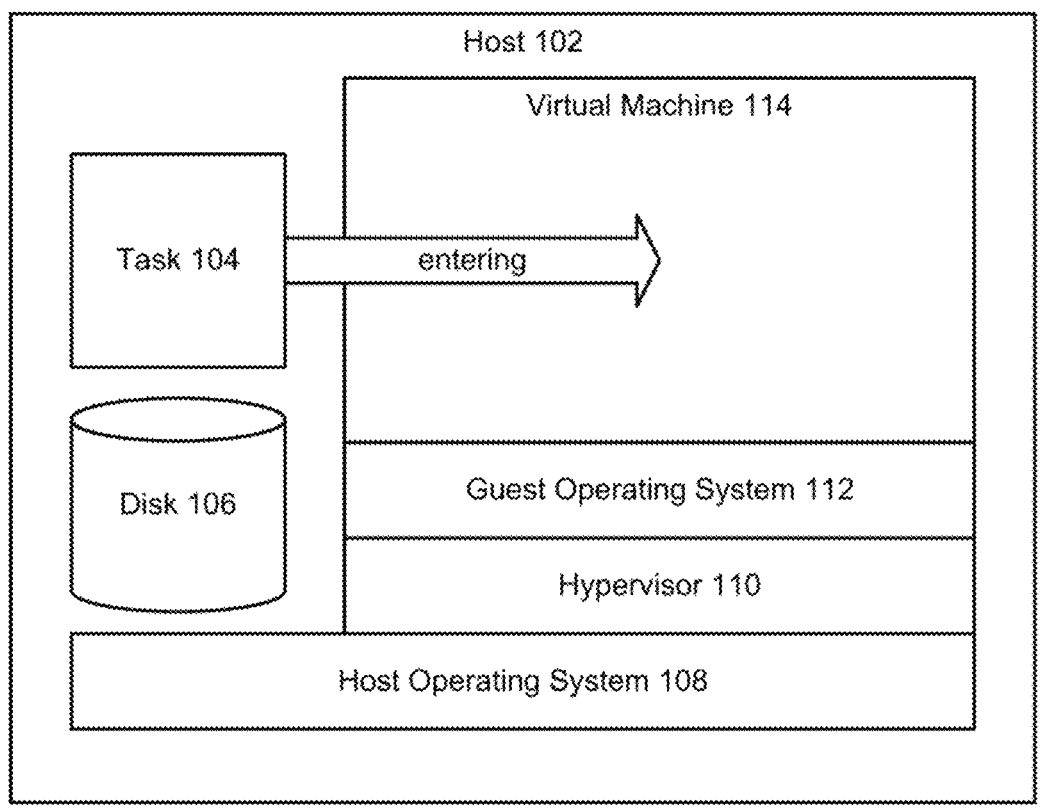
FIG. 1 is a block diagram illustrating a system for transparently moving a process from a host to a virtual execution environment, in accordance with aspects of the present disclosure.

FIG. 1 is a block diagram illustrating a system 100 for transparently moving a process from a host to a virtual execution environment (VEE), for example, into a virtual machine (VM), in accordance with aspects of the present disclosure. System 100 comprises host 102, which may be any type of computer, computing device, or server capable of running an operating system (OS). Host operating system 108 may be an operating system such as macOS, Microsoft Windows, Linux, Unix, etc. Host 102 comprises task 104, which may be a process in the host OS that needs to be moved (e.g., pushed) into a virtual machine 114. Guest operating system 112 (e.g., macOS, Windows, Linux, Unix, etc.) runs in the virtual machine 114, which is managed by hypervisor 110. Hypervisor 110 runs on host, and any kind of hypervisor may be used (for example, the figure shows a type 2 (though this is not obligatory) hypervisor). Host 102 may or may not also have network access and/or comprise a disk 106 used for storage purposes.

An entering module is responsible for entering a process into the VM. In some aspects, an entering module that is configured to perform actions to move/push the process into the VM may comprise at least one of: host OS kernel module, guest OS kernel module, guest agent, live migration tool, hypervisor, etc.

Figure 2:
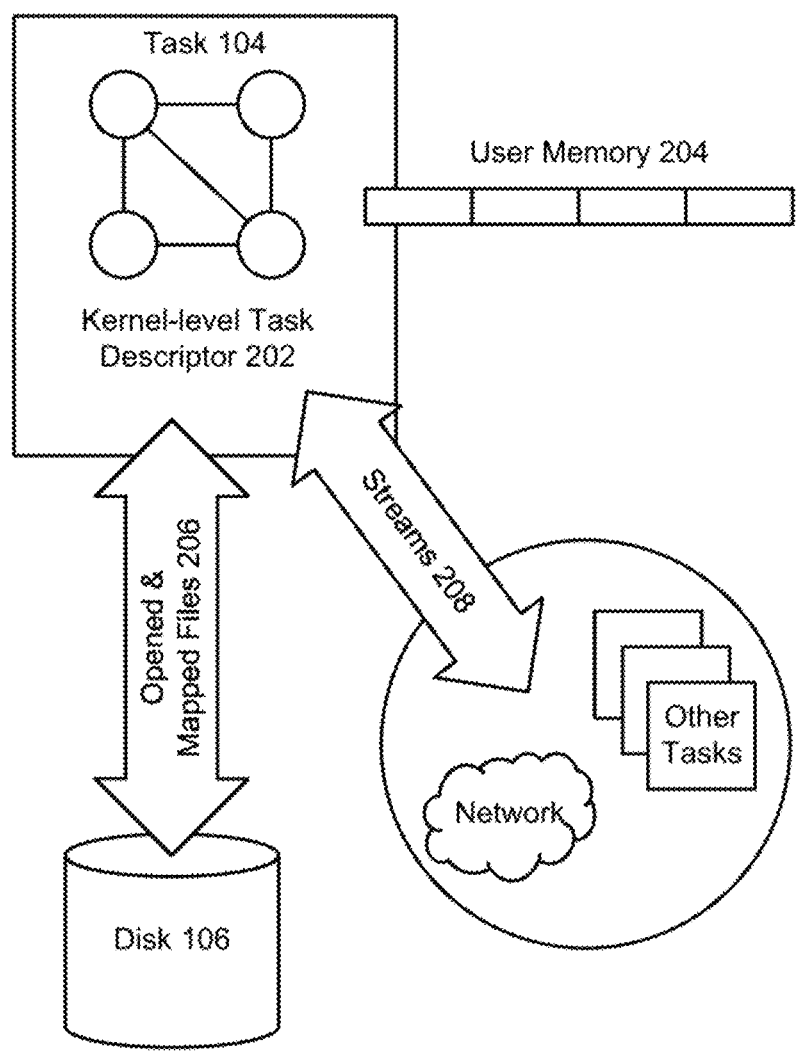
FIG. 2 is a block diagram illustrating the components associated with moving a process from a host to a VM, in accordance with aspects of the present disclosure.

FIG. 2 is a block diagram illustrating the components associated with moving a process from a host to a VM (e.g., from host OS to a guest OS in the VM), in accordance with aspects of the present disclosure. In particular, there are at least four factors taken into consideration: kernel-level task descriptor 202 (also referred to as kernel-level process descriptor), user memory 204, and IO resources like opened and memory mapped files 206, and streams 208.

Kernel-level task descriptor 202 is a complex set of objects that resides in the kernel address space of host OS 108 (i.e., comprised of kernel objects) and describes a process for the OS kernel. User memory 204 is a set of memory pages containing process data, stack and, partially, the code. Opened and memory mapped files 206 may be files used by task 104 according to the task's business logic (e.g. configuration files, log files, any files needed by user, etc.) and libraries needed by the task to operate. The libraries are typically mapped to the process' address space. In one aspect, some of the files may be stored on network storage and may be available via a network. Streams 208 may comprise communication channels, in some aspects, for example, task-to-network channels (e.g., network sockets) to communicate to the outer world (e.g., a network) and task-to-task channels (e.g., pipes) to communicate to other processes (e.g., other tasks) on the same host 102. Input-output (IO) resources may comprise any kinds of files, streams, and communication channels. For example, an IO resource may be a file on the host disk, an opened file, a memory mapped file, an opened directory, a communication channel, a stream, an IO channel, a task-to-network channel, a task-to-task channel, a pipe, a pseudo terminal (PTY) pair, a socket (a unix socket, a network socket), etc.

Figure 3:
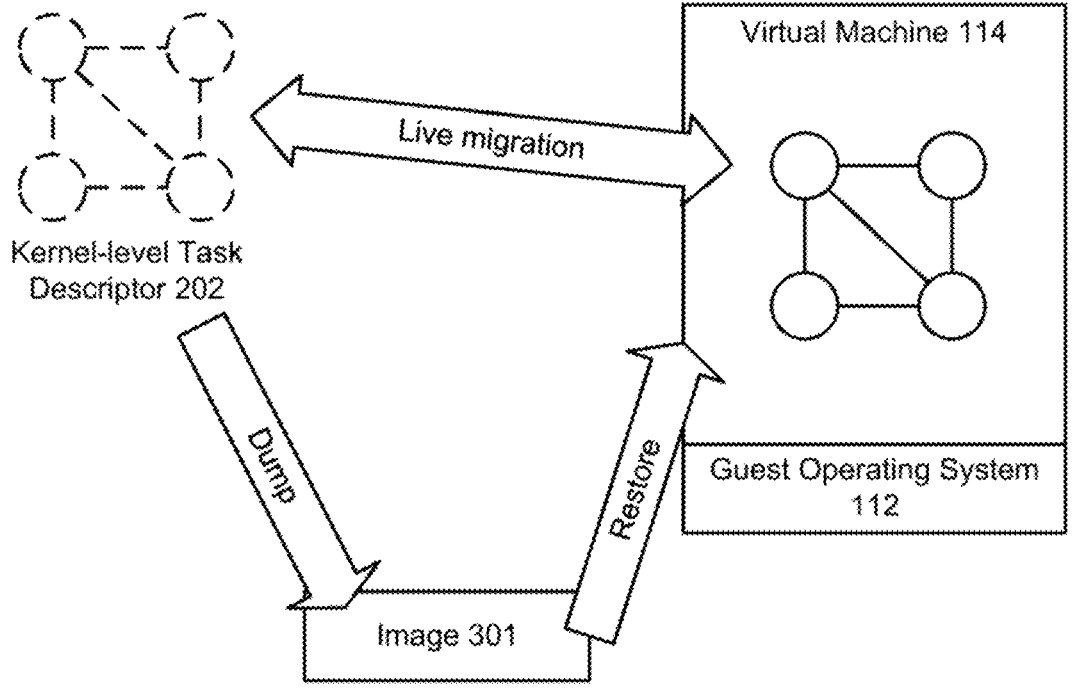
FIG. 3 is a block diagram illustrating methods for transferring kernel-level process descriptors from a host to a VM, in accordance with aspects of the present disclosure.
Figure 3:
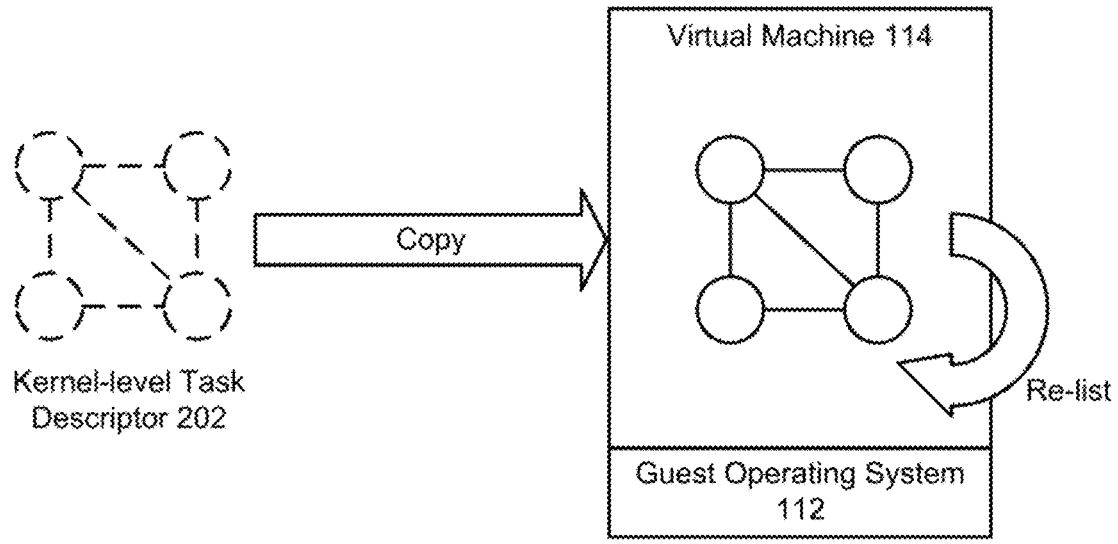

FIG. 3 is a block diagram illustrating methods 300 and 302 any of which can be used for transferring kernel-level process descriptors (and other kernel objects) from host 102 to VM 114, in accordance with aspects of the present disclosure.

Method 300 comprises transferring kernel-level task descriptor 202 (and other kernel objects) into the virtual machine 114 using (e.g., by the entering module) modified live migration techniques in which the live migration module skips migrating user memory pages and fixes (as is described below and shown on FIG. 5 and FIG. 6) and IO resources (e.g., files 206 and streams 208) as files and streams are redirected via a hypervisor channel and (if needed) VM and host-side proxies, accordingly. Live migration provides a transfer of services/processes between machines without impacting client processes/applications. In the context of kernel-level task descriptor 202, live migration involves dumping (e.g., saving the state of) the objects on a memory page, in a file, or on disk 106, etc., via host 102 and restoring the objects (or a state of the process) from said dump (e.g., image 301) via virtual machine 114. In some aspects, transferring an object to a VM using live migration does not involve writing to disk 106. Instead, live migration involves adding image 301 into memory and then remapping the memory to a VM or copying the image 301 to the guest operating system 112.

Method 302 comprises transferring kernel-level task descriptor 202 (and other kernel objects) into the virtual machine 114 by copying (e.g., by the entering module) kernel objects (e.g., any descriptor structures, in-kernel structures corresponding to process, or only kernel-level task descriptor 202—also referred to as kernel-level process descriptor, etc.) to the guest OS kernel 112 and re-listing (also called re-shuffling) the descriptor structures in the guest OS kernel (and, in one aspect, for example, by a guest OS kernel module) in manner analogous to container entering (e.g., as if they were container-entering host). One of the examples of task descriptor may be a "task_struct" structure in Linux. For example, consider Linux's "task_struct", which is a data type called "struct" in C programming language and which has many fields (e.g., process name, identifier (pid), group, session, owner, links to parent process, file descriptors table, virtual memory descriptor, current working directory, etc). When used by the OS kernel, the kernel-level task descriptor 202 structure is "listed" in many lists/hashes/trees (e.g., it sits in a global list of all processes, hashed in the hash-table that maps process ID number into the "task_struct", and/or is in a tree that describes the processes hierarchy in Linux). Re-listing of kernel-level task descriptor (e.g., "task_struct" in case of Linux) means that the structure will be removed from host-side lists/hashes/trees and will be added into proper places into guest's lists/hashes/trees of the same meaning.

While re-listing in 302 and while live migrating in 300, IO resources, like streams and opened/memory mapped files, should be fixed (e.g., reconfigured or redirected to point to a host-VM channel). This is further explained below.

In some aspects, during re-listing and live migration, some kernel structures can be changed in order to, for example, attach the host-VM channel (described below) to the process. For example, in one aspect, a reference (or index, indication, etc.) to a part of host-VM channel may replace a reference to the IO resource in process file descriptor table.

In some aspects, the method of transferring the kernel objects first determines whether the method 300 or 302 shall be used. In some aspects, if the host and the guest OS have the same version of the kernel, the objects translation is copying (e.g., 302); and if the host and the guest OS differ in versioning, a live-migration technique (e.g., 300) is used. In another aspects, method 300 may be used even when the types and formats of kernel objects in host OS and VM OS are not the same, and 302 —when they are the same. In yet another aspects, method 302 may be used, for example, when guest OS is able to work with host OS' kernel-level task descriptors types. In some aspects, the method involves determining whether host OS 108 and guest OS 112 are of the same type (e.g., whether both are Linux, Windows, Unix, etc., or both have similar OS kernels) or whether guest OS 112 has a module for supporting host OS processes execution (e.g., Windows 10 supports native Linux processes execution). In the event that either the respective operating systems are of the same type or guest OS 112 can support host OS processes execution, guest OS 112 can work with host OS' kernel-level task descriptor 202.

Figure 4:
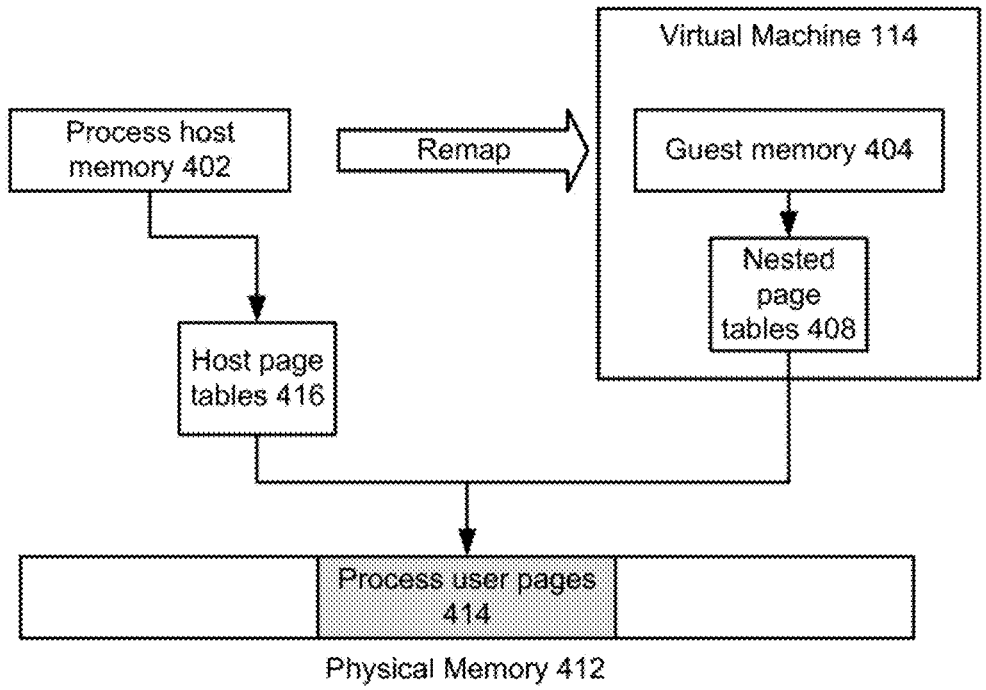
FIG. 4 is a block diagram illustrating a method for remapping memory pages, in accordance with aspects of the present disclosure.
Figure 4:
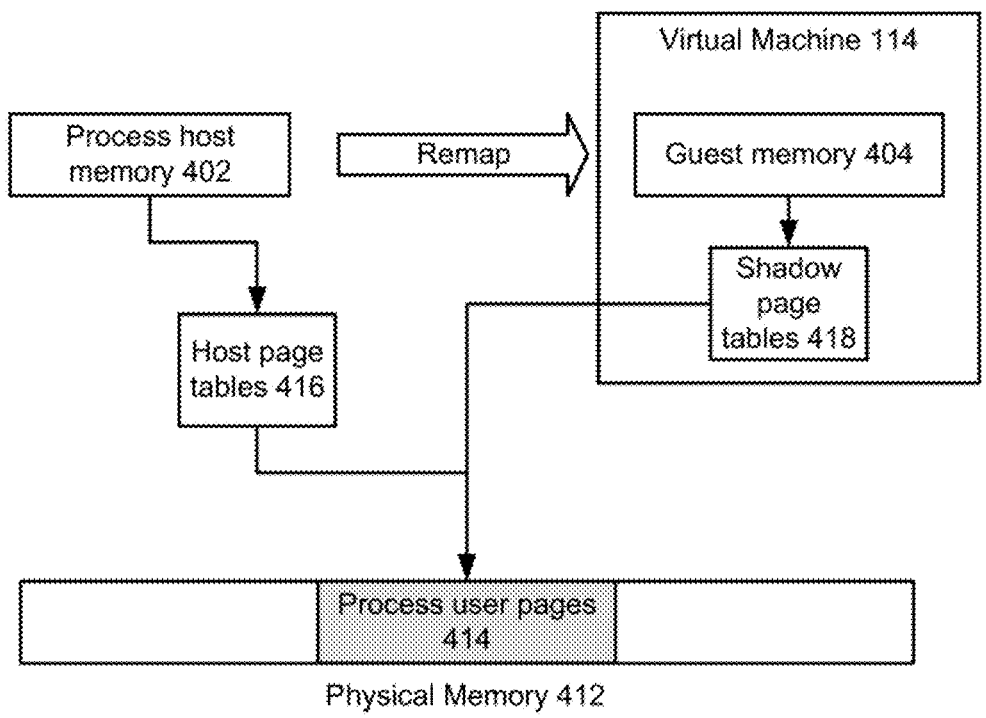

FIG. 4 is a block diagram illustrating exemplary methods 400 and 450 for remapping memory pages, any of which can be used depending on how the hypervisor manages VM memory (e.g., on the type of paging being used), in accordance with aspects of the present disclosure. Before moving into VM, the process used to work with the process's host memory 402, e.g., with virtual addresses (included in the range of 402) that were mapped (using host page tables 416) to some host physical memory pages (e.g., process user pages 414) in host physical memory 412. After moving into the VM, the process uses guest memory 404, which shall have the same data at the same virtual addresses, as before. This may be achieved by several ways. In some aspects, the physical pages (containing needed data, e.g., pages 414) may be remapped from the host to the guest. In some other aspects, the data may be copied from host OS to guest OS. In some aspects, the entering module (e.g., with help of the hypervisor) re-maps the process user physical pages 414 from a host virtual address into a guest virtual addresses. This may be done, for example, with help of the hypervisor, using any of the hypervisor memory mapping means (e.g., nested page tables 408 (in method 400) or shadow (in method 450) page tables 418, etc.). In one aspect, user memory may comprise user space memory pages of the process. In one aspect, because user memory is a set of pages mapped at certain virtual addresses, the respective physical pages may be re-mapped from process host memory 402 into guest memory 404 of guest OS 112 with, for example, hypervisor memory mapping means (e.g., nested page tables 408 (in method 400) or shadow page tables (in method 450)). In other words, the memory (at least one page of memory), used by the process, is mapped inside the VM, and then the in-VM page-tables of that process are set-up to point to the pages as they are now seen in VM.

A page table is a data structure that stores the mapping between logical memory addresses and physical memory addresses. Logical memory addresses are generated by a CPU for the pages of the processes and physical addresses are the actual frame addresses of the memory (e.g., used by the hardware). Nested page table is technically similar, but defines the mapping between physical memory address from the perspective of the VM and the real physical address. In some aspects, memory remapping refers to adding nested page table (NPT) entries in case VM memory is virtualized with NPT technology. In some aspects, the VM memory is virtualized without NPT and thus, memory remapping refers to altering shadow page tables 418.

For nested page tables case (400) the remapping may move the host page tables 416 into the guest (or, in one aspect, making them become host page tables) and create needed entries in the VM nested page tables (NPT) tables. For shadow page tables case (450) the new entries in the shadow page tables (418) may be created by the entering module.

In both cases, using nested or shadow paging, a goal is to keep the mapping (task virtual memory→"page tables-"→physical memory) maps the same virtual address to the same host physical address as it was before the moving of the process.

It should further be noted that if libraries, that are mapped into the process, match between the host and the VM, then the corresponding memory map for the entered process is set-up to point to VM-side library.

Figure 5:
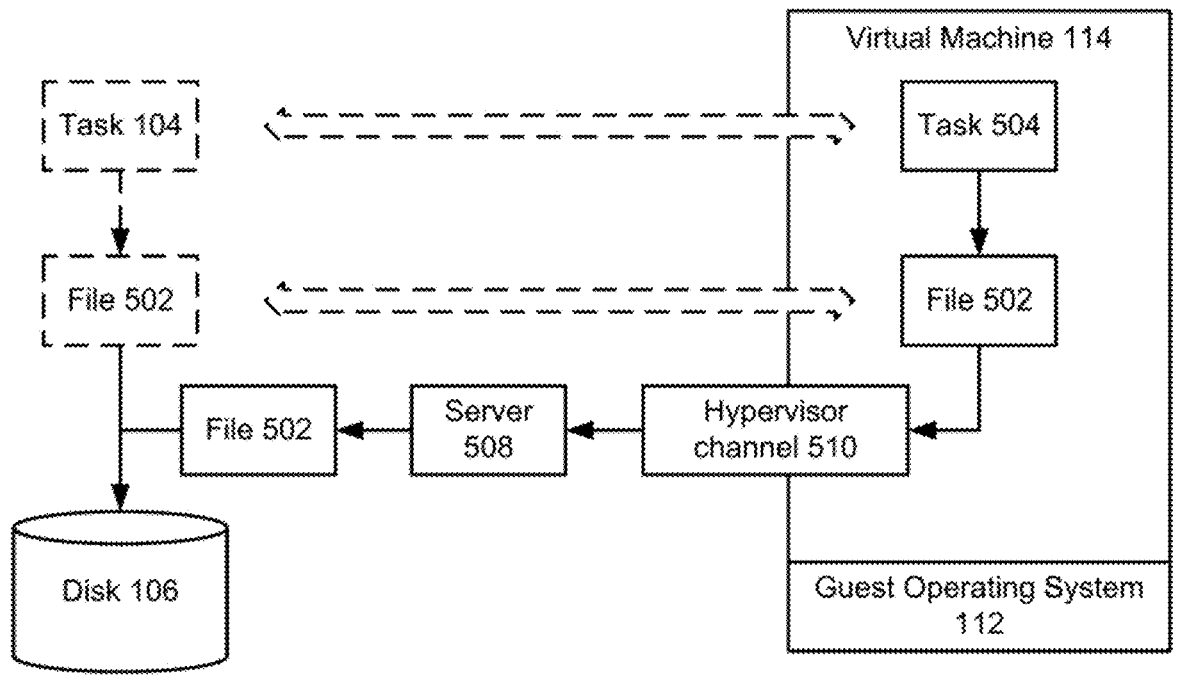
FIG. 5 is a block diagram illustrating methods for enabling a process to work with different IO resources that the process has used before entering, in accordance with aspects of the present disclosure.
Figure 5:
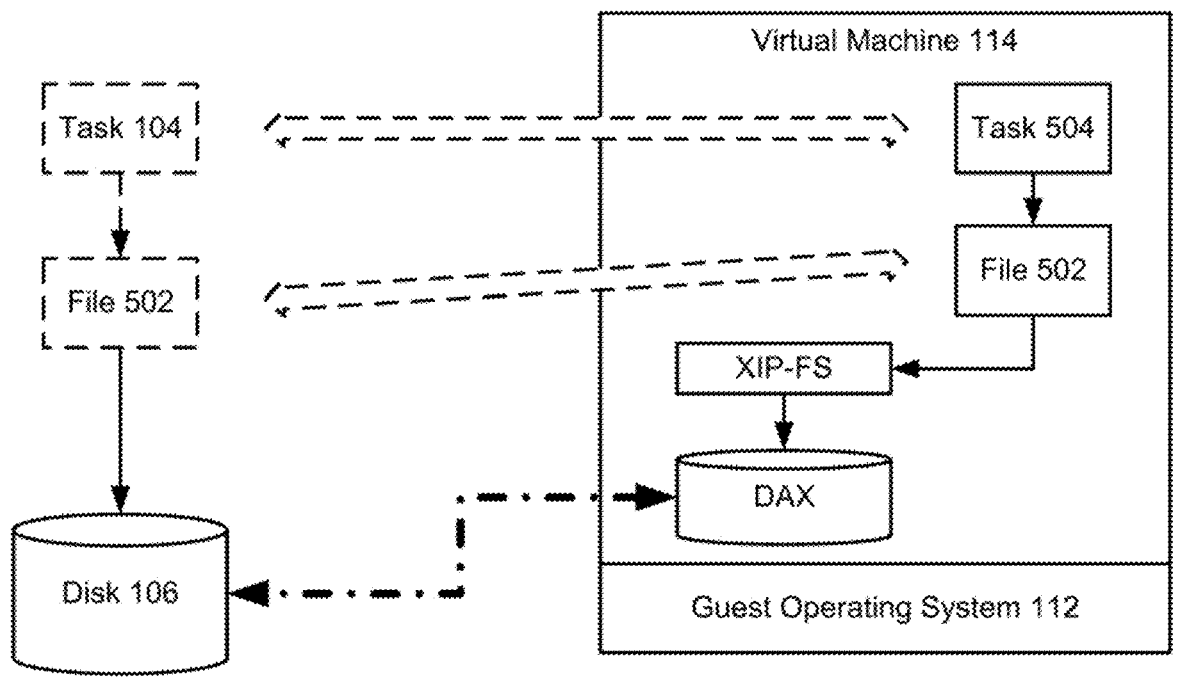
Figure 6:
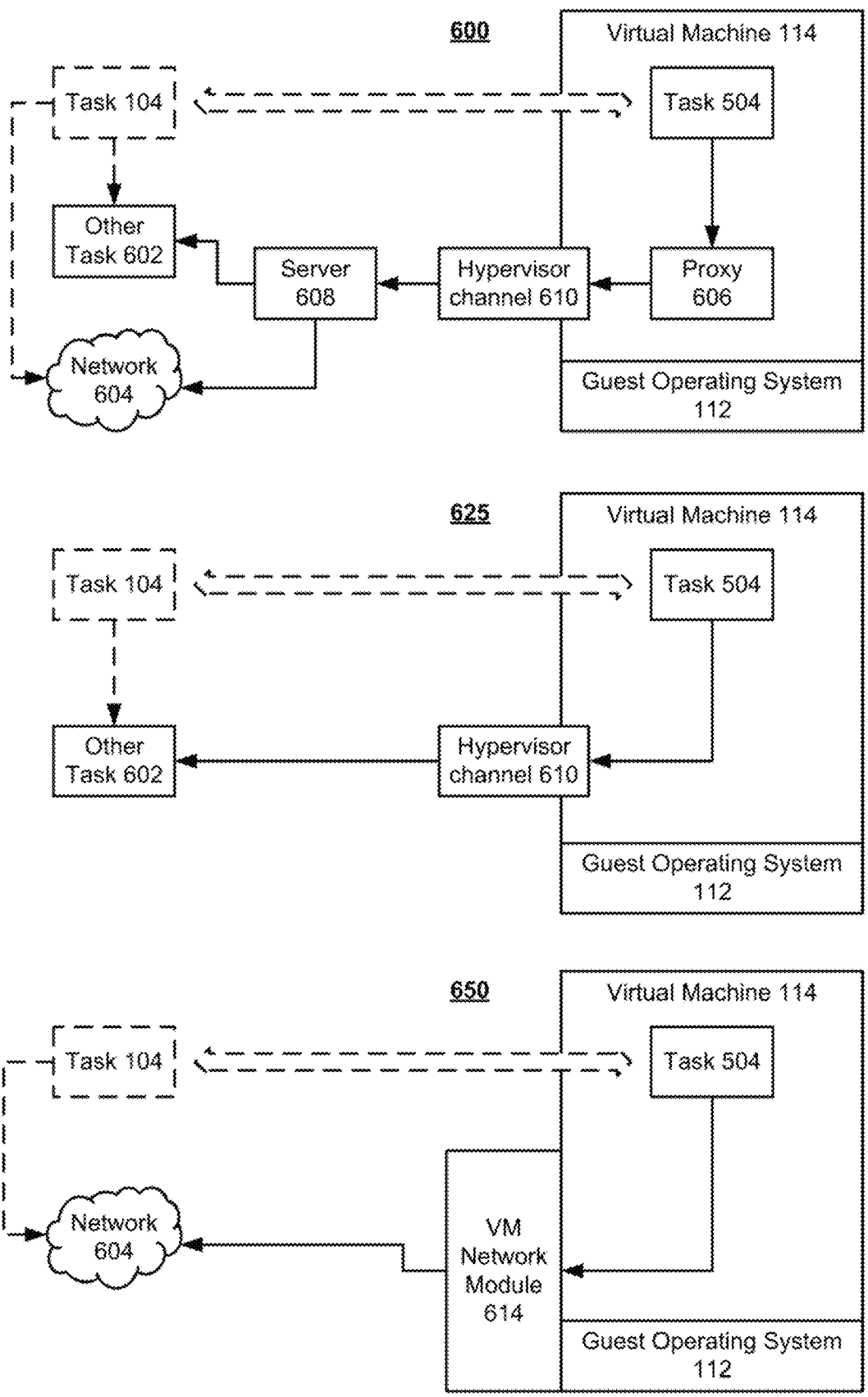
FIG. 6 is a block diagram illustrating methods for reconfiguring communication channels, in accordance with aspects of the present disclosure.

FIGS. 5 and 6 are block diagrams illustrating exemplary aspects for providing for a process (e.g., a moved task 504 running inside VM 114) an ability to work with different IO resources that the process (e.g., an original task 104 on host) has used before entering, in accordance with aspects of the present disclosure.

The host-VM channel is used for providing the entered process (e.g., task 504 in VM) with an ability to work with the IO resource that the process (e.g., task 104) has used before entering (and also to work with any IO resource on host). In one aspect, the host-VM channel is a part of the entering module.

In one aspect, the host-VM channel handles requests from the process (e.g., 504) intended/directed to the IO resource and redirects them to the IO resource on the host. The host-VM channel helps the data flow cross the host-VM boundary, i.e., enables data flow between host and VM.

Assuming the process (e.g., 104) worked with an IO resource on host. After entering (e.g., pushing/moving) the process into the VM, the process (e.g., 504) in VM should also have an ability to work with the IO resource. In some aspects, the real IO resource stays on host and the proxy channel (e.g., host-VM channel) between the IO resource and the process (e.g., 504 in VM 114) is created, which is used to forward requests from the process to IO resource and back. The host-VM channel may serve as the proxy channel between the IO resource and the process.

In one aspect, the host-VM channel is attached to the process. For example, the host-VM channel may replace the IO resource for the process. It should be noted that here, the process does not understand that it now works (e.g., communicates, sends requests, receives responses/requests from, sends data—the action may depend on the type of the resource and may vary in different aspects) with the host-VM channel and not with the IO resource itself. For example, in one aspect, a file descriptor belonging to a part of host-VM channel replaces a file descriptor of the IO resource in the task's file descriptor table (FDT). In one aspect, the attachment is done during live migration or re-listing of the kernel structures.

In one aspect, the IO resource is reconfigured to point to the host-VM channel.

The host-VM channel comprises at least one of: a VM-side pseudo resource, a communication channel between guest OS and host OS (also called hypervisor channel), and a host-side proxy. For example, the VM-side pseudo resource may replace the IO resource for the process. In one aspect, part of the host-VM channel receives requests from the process and handles them by sending them to the hypervisor channel, and transmits the responses from the hypervisor channel back to the process. For example, the VM-side pseudo resource may be configured to forward data between the hypervisor channel and the process. In one aspect, the hypervisor channel may be a communication channel (e.g., provided by the hypervisor, or via network, etc.) to enable data flow between the host and the VM. In one aspect, the host-side proxy is configured to forward data between the hypervisor channel and the IO resource. In one aspect, the VM side pseudo resource is a proxy process configured to forward data between the hypervisor channel and the process.

In one aspect, the VM-side pseudo resource, the hypervisor channel, and the host-side proxy are needed to forward requests from the process to the IO resource on the host and back. In another aspect, one or two of these three components of the host-VM channel may be omitted (i.e., not used). In such case, existing parts may take some responsibilities from the omitted ones: for example, if the VM-side pseudo resource is omitted then the hypervisor channel is connected (attached) directly to the process and if the host-side proxy is omitted, the hypervisor channel is attached directly to the IO resource on host.

FIG. 5 is a block diagram illustrating exemplary aspects 500 and 512, any of which can be used for providing for a process an ability to work with a file, in accordance with aspects of the present disclosure.

The moved process is shown as a task 504 inside the VM. The host-VM channel provides to the task an ability to work with a file 502 (e.g., a file may lay on disk 106 and be opened or memory mapped by the process). In some aspects, file 502 may be any kind of file and not only a file on disk 106 (in some of these aspects, there is no disk 106 at all).

The host-VM channel handles file system requests (e.g., open, read/write, memory map (mmap), etc., for file access and page-faults for memory map access) issued by task 504 running in VM 114, and redirects them to the file 502 on host 102 and back. This can be achieved by any of two methods shown on the FIG. 5. On method 500 shown on FIG. 5, the IO resource is a file on host disk. In this case, part of the host-VM channel (shown as file 502 inside the VM) may comprise a pseudo file, a virtual file, a virtual file system, etc. The pseudo resource resides on VM side and acts as the file 502 for the process, receives process requests to the file. It is attached to the process 504, replaces (for the process) the real file 502 (that is on host) and forwards requests from process 504 to the hypervisor channel (e.g., forwards data between the process and the hypervisor channel). For example, the VM-side pseudo resource replaces the real file in the task's file descriptor table (FDT). The hypervisor channel of the host-VM channel is shown on the figure as a hypervisor channel 510. In one aspect, the VM-side pseudo resource on the hypervisor side that forwards data between the VM and the host may be a hypervisor specific channel, like virtio—socket. The host-side proxy of the host-VM channel may comprise a server 508 on the host, which will handle requests received from hypervisor channel 510 by redirecting them to real file on the host (i.e., shown as file 502 on host). In one aspect, the host-side proxy is a proxy process that forwards data between the hypervisor channel and the real IO resource (e.g., file 502 on host that was used by the process when the process "lived" on the host).

In one aspect, the VM-side pseudo resource and the host-side proxy can be implemented as a FUSE module. For example, the VM-side pseudo resource may be represented by a FUSE file system; the hypervisor channel may be represented by a virtio socket and the host-side proxy may comprise a 1:1 FUSE back-end. In another aspect, the VM-side pseudo resource and the host-side proxy may comprise a network file system between host and guest, and channel 510 in this case may be implemented in different ways: e.g., as a hypervisor channel between host and guest, or even as a network connection between the VM-side pseudo resource and the host-side proxy. In one aspect, the file descriptor of the VM-side pseudo resource (e.g., file 502 in VM) is "installed" into FDT of the task as shown in FIG. 3, either by live migration or by re-shuffling of the task descriptors. In one aspect, the process does not understand/notice the replacement of the real file 502 (on host) by the VM-side pseudo resource of the host-VM channel (file 502 in VM), and "thinks" that it proceeds to work with the file directly (e.g., like if the file has also been moved to VM—shown by thick dashed arrows).

In one aspect, in method 500, task 504 is the pushed version of task 104. The VM-side pseudo resource of the host-VM channel may comprise a virtual file system on the guest side (e.g., file 502 on VM 114) that facilitates the proxying process. The host-VM channel may be implemented using existing components such as FUSE, which may serve as the particular proxy for the guest file system. A proxy is an intermediary for requests from clients seeking resources from servers that provide those resources.

In one aspect, the hypervisor-specific communication channel has a goal to pass data (e.g., as streams or packets) between the host and VM. The hypervisor-specific communication channel may be implemented using virtio sockets (where virtio-vsock provides a way for tasks running on VM 114 and host 102 to communicate with each other using a standard socket interface). In some aspects, method 500 may be implemented by establishing a network file system between VM 114 and host 102.

On method 512 shown on FIG. 5 the IO resource is a file on host disk. In method 512, the host files needed by the process (e.g., task 104) are shared using (1) a DAX device, which is a mean for enabling direct access to files stored in persistent memory or on a block device, and (2) execute in place (XIP) mode of the file system, which is a way of executing programs directly from long term storage rather than copying it into RAM. Disk 106 is DAX-ed into a guest disk and then XIP-mounted in it. For example, a virtual disk for a VM may be represented inside the guest as a virtual flash memory device directly mapped at some guest-physical memory addresses. This is referred to as DAX. XIP is the special mode of operation for file-systems. They "know" that they run on such a flash and do not generate page-cache pages when working with it, instead, they grab the flash device pages and use them as page-cache ones. Then the files and file memory maps are attached to the process and restored (e.g., via live migration or re-listing).

In this case the VM-side pseudo resource of the host-VM channel becomes a file (e.g., file 502 in VM) opened on XIP-FS, the hypervisor channel and the host-side proxy both become the DAX device.

It should be further noted that memory mapped files are configured/proxied like other IO resources (i.e., in IO-resources manner).

In one aspect, either case (proxied by 500 or XIP/DAX-ed by 512), the references of the host-VM channel (e.g., "new" file descriptors belonging to the part a)) are installed into task in VM 114 by live migration or relisting module from FIG. 3.

FIG. 6 is a block diagram illustrating methods 600, 625, and 650 for reconfiguring communication channels, in accordance with aspects of the present disclosure. In FIG. 6, the IO resource in question is a communication channel (e.g., a pipe, a socket, task-to-task or task-to-network communication channel, stream, etc.). There are several ways to keep streams working during entering of a process into VM. Tree exemplary methods are shown on the FIG. 6.

On FIG. 6, the process (e.g., task 104) worked on the host and communicated with another task 602 or was connected to network 604 (e.g., local network, intranet, Internet, worldwide computer network, etc.). The process is moved into the VM 114. The moved process is shown as a task 504 inside the VM 114. The host-VM channel provides to the task an ability to proceed working with the other task 602 or network 604.

In method 600, the approach is to proxy (e.g., create a proxy). In this aspect, the VM-side pseudo resource of the host-VM channel may comprise a guest-side proxy (e.g., proxy 606), which acts as the other task 602 or the network 604 from task 504's point of view (in one aspect, the process does not notice the replacement); the host-side proxy of the host-VM channel may comprise host-side server (e.g., server 608); and the hypervisor channel of the host-VM channel may comprise hypervisor-specific communication channel between them (e.g., hypervisor channel 610). The VM-side pseudo resource, the hypervisor channel 610, and the host-side proxy forward requests/responses from task 504 to other task 602 or network 604 and back.

In one aspect, the attachment of the VM-side pseudo resource to the process is established by live migration or re-listing module as described in FIG. 3. The host-side proxy and/or the hypervisor channel, in case of 625, is installed into other task 602 by replacing file descriptors.

In one aspect, the whole communication channel is replaced by the host-VM channel. In one aspect, in response to determining that an IO resource is a network socket and that the VM has network access, the entering module may create a network socket on the VM side and reconfigure a network connection of the VM.

Method 625 depicts one aspect with task-to-task communication channels (e.g., streams, pipes, etc.). Relative to method 600, in method 625, the stream can be replaced with the hypervisor channel 610. The task-to-task communication channel in this case is not split, but replaced with another stream type. Installation into task 504 and other task 602 is performed in the same way as described before.

In one aspect, if the IO resource/file in question is a pipe, unix socket, a pseudo terminal (PTY) pair or any other local channel the VM-side pseudo resource can be omitted and the hypervisor channel's VM end should be put into task's FDT. Additionally, the host-side proxy can also be omitted and the hypervisor channel's host end may be put into the FDTs of host-side process by using the technique described in Emelyanov et al., U.S. Pat. No. 10,452,408, which is incorporated by reference.

Method 650 depicts one aspect with task-to-network streams (e.g., sockets). The connection between task 504 and network 604 can be re-routed or bridged by VM network module 614. In this case the stream is not split or replaced. Instead, the packet flow is re-configured while doing live migration or relisting from FIG. 3.

In one aspect, if the IO resource/file in question is a network socket, then the whole VM-side pseudo resource, hypervisor channel, host-side proxy chain can be omitted. Instead, a socket is preserved on the VM-side, and on the host side, a NAT rule applies that makes sure the traffic from the socket in question is forwarded properly.

In one aspect, the IO resource/file in question is a pipe, a unix socket, or any other "local" channel, the host side proxy can be omitted such that the channel peer is re-attached (as described in U.S. Pat. No. 10,452,408) to the hypervisor channel.

In one aspect, the IO resource/file in question is a network socket and the VM has network access, the three portions may be replaced with a VM-side socket and a host-side NAT tunnel.

Figure 7:
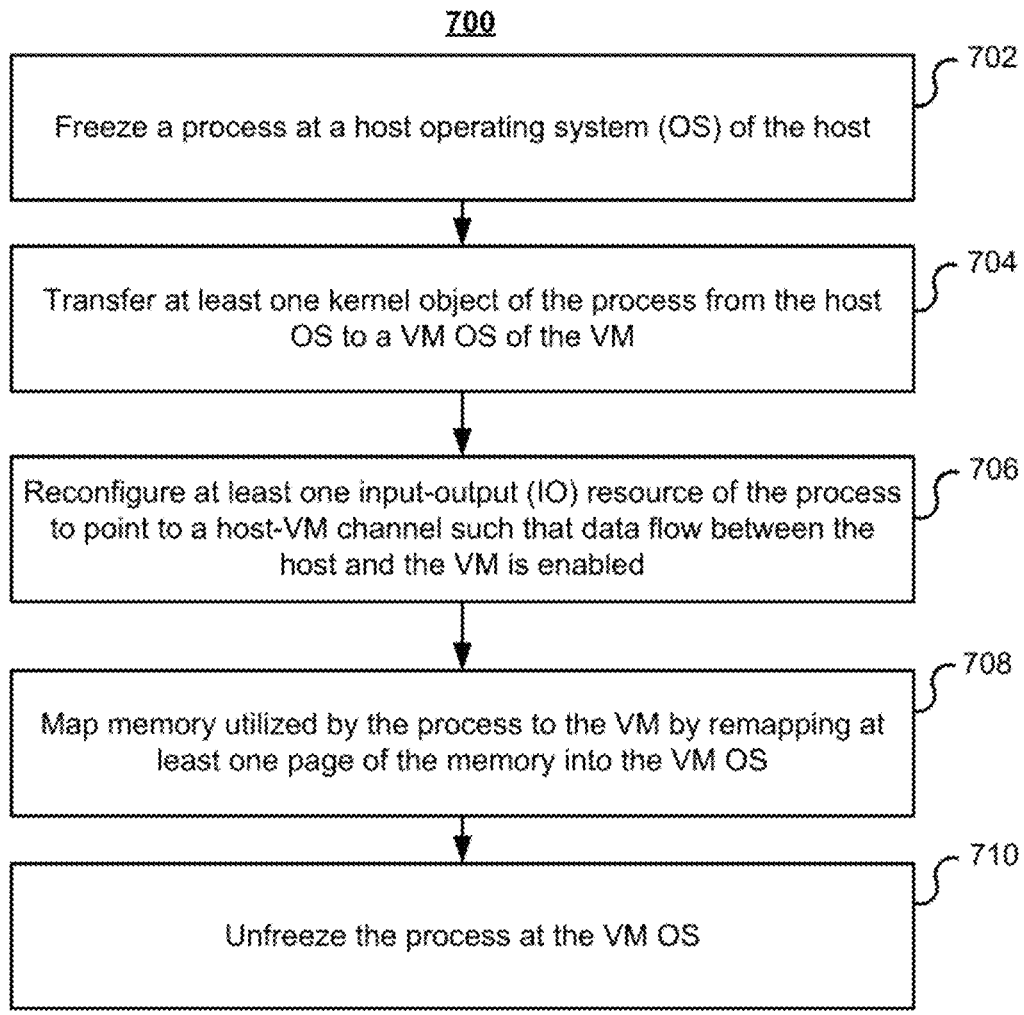
FIG. 7 illustrates a flow diagram of a method for transparently moving a process from a host to a virtual machine (VM), in accordance with aspects of the present disclosure.

FIG. 7 illustrates a flow diagram of a method 700 for transparently (e.g., the process may even not notice it) moving a process from a host to a virtual machine (VM), in accordance with aspects of the present disclosure. All steps of method 700 may be performed using an entering tool/module, whose purpose is to push a process from a host OS to a guest OS. The entering tool/module may reside on the host and/or the guest. At 702, method 700 involves freezing a process (e.g., task 104) at a host operating system (OS) 108 of host 102. At 704, method 700 transfers at least one kernel object of process (e.g., task 104) from host OS 108 to guest OS 112 of VM 114. At 706, method 700 reconfigures at least one input-output (IO) resource of the process (e.g., in one aspect, a host IO resource that was utilized by the process)

to point to a host-VM channel such that data flow between host 102 and VM 114 is enabled. An example of IO resource may be a file, stream, communication channel (e.g., task-to-task or task-to-network channel), etc. At 708, method 700 maps the memory utilized by the process (e.g., task 104) to VM 114 by remapping at least one page of the memory (e.g., a page of physical memory) into guest OS 112. At 710, at method 700 unfreezes the process at guest OS 112.

Figure 8:
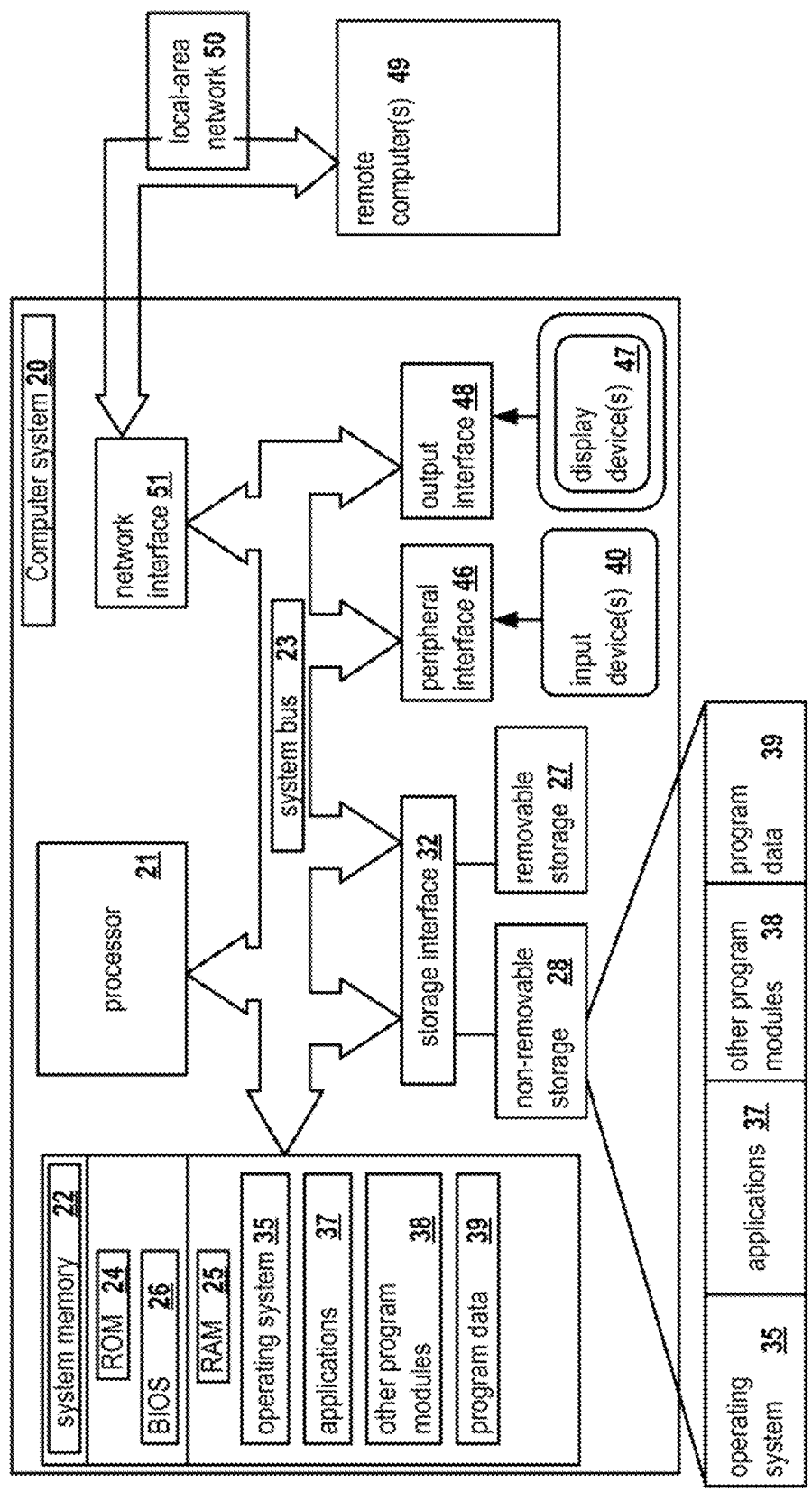
FIG. 8 presents an example of a general-purpose computer system on which aspects of the present disclosure can be implemented.

FIG. 8 is a block diagram illustrating a computer system 20 on which aspects of systems and methods for transparently moving a process from a host to a virtual machine (VM) may be implemented in accordance with an exemplary aspect. The computer system 20 can be in the form of multiple computing devices, or in the form of a single computing device, for example, a desktop computer, a notebook computer, a laptop computer, a mobile computing device, a smart phone, a tablet computer, a server, a mainframe, an embedded device, and other forms of computing devices.

As shown, the computer system 20 includes a central processing unit (CPU) 21, a system memory 22, and a system bus 23 connecting the various system components, including the memory associated with the central processing unit 21. The system bus 23 may comprise a bus memory or bus memory controller, a peripheral bus, and a local bus that is able to interact with any other bus architecture. Examples of the buses may include PCI, ISA, PCI-Express, Hyper-Transport™, InfiniBand™, Serial ATA, I²C, and other suitable interconnects. The central processing unit 21 (also referred to as a processor) can include a single or multiple sets of processors having single or multiple cores. The processor 21 may execute one or more computer-executable code implementing the techniques of the present disclosure. For example, any of commands/steps discussed in FIGS. 1-7 may be performed by processor 21. The system memory 22 may be any memory for storing data used herein and/or computer programs that are executable by the processor 21. The system memory 22 may include volatile memory such as a random access memory (RAM) 25 and non-volatile memory such as a read only memory (ROM) 24, flash memory, etc., or any combination thereof. The basic input/output system (BIOS) 26 may store the basic procedures for transfer of information between elements of the computer system 20, such as those at the time of loading the operating system with the use of the ROM 24.

The computer system 20 may include one or more storage devices such as one or more removable storage devices 27, one or more non-removable storage devices 28, or a combination thereof. The one or more removable storage devices 27 and non-removable storage devices 28 are connected to the system bus 23 via a storage interface 32. In an aspect, the storage devices and the corresponding computer-readable storage media are power-independent modules for the storage of computer instructions, data structures, program modules, and other data of the computer system 20. The system memory 22, removable storage devices 27, and non-removable storage devices 28 may use a variety of computer-readable storage media. Examples of computer-readable storage media include machine memory such as cache, SRAM, DRAM, zero capacitor RAM, twin transistor RAM, eDRAM, EDO RAM, DDR RAM, EEPROM, NRAM, RRAM, SONOS, PRAM; flash memory or other memory technology such as in solid state drives (SSDs) or flash drives; magnetic cassettes, magnetic tape, and magnetic disk storage such as in hard disk drives or floppy disks; optical storage such as in compact disks (CD-ROM) or digital versatile disks (DVDs); and any other medium which may be used to store the desired data and which can be accessed by the computer system 20.

The system memory 22, removable storage devices 27, and non-removable storage devices 28 of the computer system 20 may be used to store an operating system 35, additional program applications 37, other program modules 38, and program data 39. The computer system 20 may include a peripheral interface 46 for communicating data from input devices 40, such as a keyboard, mouse, stylus, game controller, voice input device, touch input device, or other peripheral devices, such as a printer or scanner via one or more I/O ports, such as a serial port, a parallel port, a universal serial bus (USB), or other peripheral interface. A display device 47 such as one or more monitors, projectors, or integrated display, may also be connected to the system bus 23 across an output interface 48, such as a video adapter. In addition to the display devices 47, the computer system 20 may be equipped with other peripheral output devices (not shown), such as loudspeakers and other audiovisual devices.

The computer system 20 may operate in a network environment, using a network connection to one or more remote computers 49. The remote computer (or computers) 49 may be local computer workstations or servers comprising most or all of the aforementioned elements in describing the nature of a computer system 20. Other devices may also be present in the computer network, such as, but not limited to, routers, network stations, peer devices or other network nodes. The computer system 20 may include one or more network interfaces 51 or network adapters for communicating with the remote computers 49 via one or more networks such as a local-area computer network (LAN) 50, a wide-area computer network (WAN), an intranet, and the Internet. Examples of the network interface 51 may include an Ethernet interface, a Frame Relay interface, SONET interface, and wireless interfaces.

Aspects of the present disclosure may be a system, a method, and/or a computer program product. The computer program product may include a computer readable storage medium (or media) having computer readable program instructions thereon for causing a processor to carry out aspects of the present disclosure.

The computer readable storage medium can be a tangible device that can retain and store program code in the form of instructions or data structures that can be accessed by a processor of a computing device, such as the computing system 20. The computer readable storage medium may be an electronic storage device, a magnetic storage device, an optical storage device, an electromagnetic storage device, a semiconductor storage device, or any suitable combination thereof. By way of example, such computer-readable storage medium can comprise a random access memory (RAM), a read-only memory (ROM), EEPROM, a portable compact disc read-only memory (CD-ROM), a digital versatile disk (DVD), flash memory, a hard disk, a portable computer diskette, a memory stick, a floppy disk, or even a mechanically encoded device such as punch-cards or raised structures in a groove having instructions recorded thereon. As used herein, a computer readable storage medium is not to be construed as being transitory signals per se, such as radio waves or other freely propagating electromagnetic waves, electromagnetic waves propagating through a waveguide or transmission media, or electrical signals transmitted through a wire.

Computer readable program instructions described herein can be downloaded to respective computing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network interface in each computing device receives computer readable program instructions from the network and forwards the computer readable program instructions for storage in a computer readable storage medium within the respective computing device.

Computer readable program instructions for carrying out operations of the present disclosure may be assembly instructions, instruction-set-architecture (ISA) instructions, machine instructions, machine dependent instructions, microcode, firmware instructions, state-setting data, or either source code or object code written in any combination of one or more programming languages, including an object oriented programming language, and conventional procedural programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a LAN or WAN, or the connection may be made to an external computer (for example, through the Internet). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present disclosure.

In various aspects, the systems and methods described in the present disclosure can be addressed in terms of modules. The term "module" as used herein refers to a real-world device, component, or arrangement of components implemented using hardware, such as by an application specific integrated circuit (ASIC) or FPGA, for example, or as a combination of hardware and software, such as by a microprocessor system and a set of instructions to implement the module's functionality, which (while being executed) transform the microprocessor system into a special-purpose device. A module may also be implemented as a combination of the two, with certain functions facilitated by hardware alone, and other functions facilitated by a combination of hardware and software. In certain implementations, at least a portion, and in some cases, all, of a module may be executed on the processor of a computer system. Accordingly, each module may be realized in a variety of suitable configurations, and should not be limited to any particular implementation exemplified herein.

In the interest of clarity, not all of the routine features of the aspects are disclosed herein. It would be appreciated that in the development of any actual implementation of the present disclosure, numerous implementation-specific decisions must be made in order to achieve the developer's specific goals, and these specific goals will vary for different implementations and different developers. It is understood that such a development effort might be complex and time-consuming, but would nevertheless be a routine undertaking of engineering for those of ordinary skill in the art, having the benefit of this disclosure.

Furthermore, it is to be understood that the phraseology or terminology used herein is for the purpose of description and not of restriction, such that the terminology or phraseology of the present specification is to be interpreted by the skilled in the art in light of the teachings and guidance presented herein, in combination with the knowledge of those skilled in the relevant art(s). Moreover, it is not intended for any term in the specification or claims to be ascribed an uncommon or special meaning unless explicitly set forth as such.

The various aspects disclosed herein encompass present and future known equivalents to the known modules referred to herein by way of illustration. Moreover, while aspects and applications have been shown and described, it would be apparent to those skilled in the art having the benefit of this disclosure that many more modifications than mentioned above are possible without departing from the inventive concepts disclosed herein.

The invention claimed is:

1. A method for moving a process from a host to a virtual machine (VM), the method comprising:
   freezing the process at a host operating system (OS) of the host;
   transferring at least one kernel object of the process from the host OS to a VM OS of the VM;
   reconfiguring at least one input-output (IO) resource of the process to point to a host-VM channel such that data flow between the host and the VM is enabled;
   in response to determining that the at least one IO resource is a network socket and that the VM has network access, creating a network socket on the VM side and re-configuring a network connection of the VM;
   mapping memory utilized by the process to the VM by remapping at least one page of the memory into the VM OS; and
   unfreezing the process at the VM OS.

2. The method of claim 1, wherein transferring the at least one kernel object further comprises:
   determining whether the host OS and the VM OS have same format of kernel objects; and
   in response to determining that the host OS and the VM OS have the same format of kernel objects, copying the at least one kernel object from the host OS to the VM OS.

3. The method of claim 2, further comprising:
   in response to determining that the host OS and the VM OS do not have the same format of kernel objects, executing a live-migration technique to perform the transferring.

4. The method of claim 1, wherein the host-VM channel comprises at least one of:
   (1) a hypervisor channel, on a hypervisor side, configured to forward data between the VM and the host,
   (2) a first proxy process, on a host side, configured to forward data between the hypervisor channel and the at least one IO resource, and
   (3) a second proxy process, on a VM side, configured to forward data between the hypervisor channel and the process.

5. The method of claim 4, further comprising:
   in response to determining that the at least one IO resource is at least one of: a pipe or a unix socket, omitting the first proxy process such that a channel peer is attached to the hypervisor channel; and
   in response to determining that the at least one IO resource is a local channel, omitting both the first proxy process and the second proxy process.

6. The method of claim 1, wherein mapping the memory further comprises one of:
adding nested page table entries; or
altering shadow page tables.

7. The method of claim 1, further comprising attaching the host-VM channel to the process.

8. The method of claim 1, wherein at least one memory mapped file is proxied using the host-VM channel.

9. The method of claim 1, further comprising:
determining whether at least one library mapped into the process matches between the host OS and the VM OS;
in response to determining that the at least one library matches, configuring a corresponding memory map of the process to point to at least one library in the VM OS.

10. A system for moving a process from a host to a virtual machine (VM), the system comprising:
a processor configured to:
freeze the process at a host operating system (OS) of the host;
transfer at least one kernel object of the process from the host OS to a VM OS of the VM;
reconfigure at least one input-output (IO) resource of the process to point to a host-VM channel such that data flow between the host and the VM is enabled;
in response to determining that the at least one IO resource is a network socket and that the VM has network access, create a network socket on the VM side and reconfigure a network connection of the VM;
map memory utilized by the process to the VM by remapping at least one page of the memory into the VM OS; and
unfreeze the process at the VM OS.

11. The system of claim 10, wherein the processor is configured to transfer the at least one kernel object by:
determining whether the host OS and the VM OS have same format of kernel objects; and
in response to determining that the host OS and the VM OS have the same format of kernel objects, copying the at least one kernel object from the host OS to the VM OS.

12. The system of claim 11, wherein the processor is further configured to:
in response to determining that the host OS and the VM OS do not have the same format of kernel objects, execute a live-migration technique to perform the transferring.

13. The system of claim 10, wherein the host-VM channel comprises at least one of:
(1) a hypervisor channel, on a hypervisor side, configured to forward data between the VM and the host,
(2) a first proxy process, on a host side, configured to forward data between the hypervisor channel and the at least one IO resource, and
(3) a second proxy process, on a VM side, configured to forward data between the hypervisor channel and the process.

14. The system of claim 13, wherein the processor is further configured to:
in response to determining that the at least one IO resource is at least one of: a pipe or a unix socket, omit the first proxy process such that a channel peer is attached to the hypervisor channel; and
in response to determining that the at least one IO resource is a local channel, omit both the first proxy process and the second proxy process.

15. The system of claim 10, wherein the processor is configured to map the memory by performing one of:
adding nested page table entries; or
altering shadow page tables.

16. The system of claim 10, wherein the processor is configured to attach the host-VM channel to the process.

17. The system of claim 10, wherein at least one memory mapped file is proxied using the host-VM channel.

18. A non-transitory computer readable medium storing thereon computer executable instructions for moving a process from a host to a virtual machine (VM), comprising instructions for:
freezing the process at a host operating system (OS) of the host;
transferring at least one kernel object of the process from the host OS to a VM OS of the VM;
reconfiguring at least one input-output (IO) resource of the process to point to a host-VM channel such that data flow between the host and the VM is enabled;
in response to determining that the at least one IO resource is a network socket and that the VM has network access, creating a network socket on the VM side and re-configuring a network connection of the VM;
mapping memory utilized by the process to the VM by remapping at least one page of the memory into the VM OS; and
unfreezing the process at the VM OS.

* * * * *